United States Patent
Ryu

(10) Patent No.: US 10,432,060 B2
(45) Date of Patent: Oct. 1, 2019

(54) STATOR INSULATOR WITH PROTRUSIONS FOR MOUNTING BUS BAR

(71) Applicant: LG Innotek Co., Ltd., Seoul (KR)

(72) Inventor: Woong Seon Ryu, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 126 days.

(21) Appl. No.: 15/526,098

(22) PCT Filed: Nov. 10, 2015

(86) PCT No.: PCT/KR2015/012046
§ 371 (c)(1),
(2) Date: May 11, 2017

(87) PCT Pub. No.: WO2016/076599
PCT Pub. Date: May 19, 2016

(65) Prior Publication Data
US 2017/0310193 A1      Oct. 26, 2017

(30) Foreign Application Priority Data
Nov. 11, 2014   (KR) .................. 10-2014-0156397

(51) Int. Cl.
*H02K 5/24*      (2006.01)
*H02K 3/32*      (2006.01)
(Continued)

(52) U.S. Cl.
CPC ............... *H02K 5/24* (2013.01); *H02K 1/12* (2013.01); *H02K 3/32* (2013.01); *H02K 3/50* (2013.01);
(Continued)

(58) Field of Classification Search
CPC .. H02K 5/24; H02K 3/30; H02K 3/32; H02K 3/325; H02K 3/34; H02K 3/345;
(Continued)

(56) References Cited

U.S. PATENT DOCUMENTS

2008/0079101 A1    4/2008  Ai
2015/0333590 A1*  11/2015  Yoshida ............... H02K 3/522
                                                              310/71
2016/0111929 A1    4/2016  Kessler et al.

FOREIGN PATENT DOCUMENTS

DE    10-2013-003024 A1    8/2014
EP         2624415 A1      8/2013
(Continued)

OTHER PUBLICATIONS

Haga Hidehiro; Uda Takayuki; Aono Masato, Motor, Feb. 28, 2013, Nippon Densan Corp, JP 2013042633 (English Machine Translation) (Year: 2013).*

(Continued)

*Primary Examiner* — Julio C. Gonzalez
*Assistant Examiner* — Alexander A Singh
(74) *Attorney, Agent, or Firm* — Saliwanchik, Lloyd & Eisenschenk

(57) ABSTRACT

Provided is a motor which includes a stator including a stator core, a coil wound around the stator core, and an insulator mounted on the stator core and configured to insulate the coil and the stator core, a busbar disposed on the stator and conductively connected to the coil, a rotor disposed inside the stator, and a shaft coupled to the rotor, wherein the insulator includes a vibration prevention unit which extends from an upper side of an inner circumferential part and is in contact with an inner circumferential surface of the busbar. Therefore, the motor prevents a coating of a coil from being worn or cut by preventing the busbar from moving without an additional process or component.

10 Claims, 7 Drawing Sheets

(51) Int. Cl.
*H02K 3/50* (2006.01)
*H02K 1/12* (2006.01)
*H02K 3/52* (2006.01)

(52) U.S. Cl.
CPC ......... *H02K 3/522* (2013.01); *H02K 2203/09* (2013.01); *H02K 2203/12* (2013.01)

(58) Field of Classification Search
CPC ........ H02K 3/38; H02K 2203/12; H02K 3/50; H02K 3/505; H02K 3/51; H02K 3/52; H02K 3/521; H02K 3/522
USPC .......................................... 310/214, 215, 71
See application file for complete search history.

(56) References Cited

FOREIGN PATENT DOCUMENTS

| | | | |
|---|---|---|---|
| JP | 09312948 A | * | 12/1997 |
| JP | 10-070871 A | | 3/1998 |
| JP | 10070871 A | | 3/1998 |
| JP | 2010028889 A | | 2/2010 |
| JP | 2010104211 A | | 5/2010 |
| JP | 2013-042633 A | | 2/2013 |
| JP | 2013042633 A | * | 2/2013 |
| KR | 10-2012-0048316 A | | 5/2012 |
| KR | 20120048316 A | | 5/2012 |
| WO | WO-2014/061276 A1 | | 4/2014 |

OTHER PUBLICATIONS

Sato Kimiharu, Stator of Dynamo-Electric Machine, Dec. 2, 1997 Toshiba Corp, JP 09-312948 (English Machine Translation) (Year: 1997).*

International Search Report in International Application No. PCT/KR2015/012046, filed Nov. 10, 2015.

Supplementary European Search Report dated Oct. 4, 2017 in European Application No. 15859982.9.

* cited by examiner

STATOR INSULATOR WITH PROTRUSIONS FOR MOUNTING BUS BAR

CROSS-REFERENCE TO RELATED APPLICATIONS

This application is the U.S. national stage application of International Patent Application No. PCT/KR2015/012046, filed Nov. 10, 2015, which claims priority to Korean Application. No. 10-2014-0156397, filed Nov. 11, 2014, the disclosures of each of which are incorporated herein by reference in their entirety.

BACKGROUND

1. Field of the Invention

The present invention relates to a motor, and more particularly, to a motor including a busbar connecting coils connected in parallel to a stator.

2. Discussion of Related Art

A motor includes a shaft formed to be rotatable, a rotor coupled to the shaft, and stators fixed inside a housing. The stators are installed along a circumference of the rotor at regular intervals. Coils that form a rotating magnetic field are wound around the stators to induce electrical interaction with the rotor and induce the rotor to rotate.

A busbar electrically connected to the coils is disposed on an upper end of the stator. The busbar generally includes a ring-shaped busbar body and terminals formed on the busbar body to be connected to the coils.

The coils and the terminals are generally fused to be connected to each other, and thus problems in that coatings of the coils are worn due to vibration in an environment with strong vibration or connection terminals of the coils are cut may occur.

A major cause of the problems is movement of the busbar due to vibration. A solution to prevent movement of the busbar is impregnation or molding of a wire. However, the solution has problems in that an additional process is needed and management and manufacturing costs are increased.

SUMMARY OF THE INVENTION

The present invention is directed to a motorcapable of preventing a coating of coil from being worn or cut by preventing a busbar from moving without an additional process or component.

The scope of the present invention is not limited to the above-described objects, and other unmentioned objects may be clearly understood by those skilled in the art from the following descriptions.

According to an aspect of the present invention, there is provided a motor which includes a stator including a stator core, a coil wound around the stator core, and an insulator mounted on the stator core and insulating the coil and the stator core, a busbar disposed on the stator and conductively connected to the coil, a rotor disposed inside the stator, and a shaft coupled to the rotor, wherein the insulator includes a vibration prevention unit which extends from an upper side of an inner circumferential part thereof and is in contact with an inner circumferential surface of the busbar.

The vibration prevention unit may extend upward from the inner circumferential part so that an outer circumferential surface thereof is in contact with the inner circumferential surface of the busbar.

The busbar may include a plurality of slots which are formed in the inner circumferential surface thereof in a circumferential direction and into which the vibration prevention unit is inserted.

The busbar may include a guide disposed between the adjacent slots and protruding inward from the inner circumferential surface.

The vibration prevention unit may be forcibly inserted into the slots.

The busbar may include a stepped portion protruding inward from an upper end of the inner circumferential surface thereof and having an upper side which is in contact with the vibration prevention unit.

The stepped portion may have a stepped surface formed to be parallel to an upper surface of the vibration prevention unit.

The vibration prevention unit may include a hook formed on an upper end thereof.

The hook may be formed to protrude inward.

The hook may include a blocking surface blocking an upper surface of the busbar.

The blocking surface may be horizontally formed.

Each of the slots may have a contact surface which is in contact with the vibration prevention unit and formed to be inclined toward a center of the busbar.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present invention will be described in detail with reference to the accompanying drawings. Purposes, specific advantages, and novel features of the invention should become clear from exemplary embodiments and the following detailed descriptions in connection with the accompanying drawing. Moreover, terms and words used in this specification and claims are not to be interpreted as being limited to commonly used meanings or meanings in dictionaries and should be interpreted as having meanings and concepts which are consistent with the technological scope of the invention based on the principle that the inventors have appropriately defined concepts of the terms in order to describe the invention in the best way. In the description of the invention, when it is determined that detailed descriptions of related well-known functions and configurations unnecessarily obscure the gist of the invention, the detailed descriptions thereof will be omitted.

When a busbar is moved due to vibration, a coil wound around a stator moves while being connected to a terminal of the busbar, and thus a coating of the coil is peeled due to friction or is cut in severe cases. To fundamentally solve such problems, a motor according to one embodiment of the present invention is a device invented to increase a fixing force of a bus.

Hereinafter, a motor according to one embodiment of the present invention will be described in detail with reference to the accompanying drawings.

Figure 1:
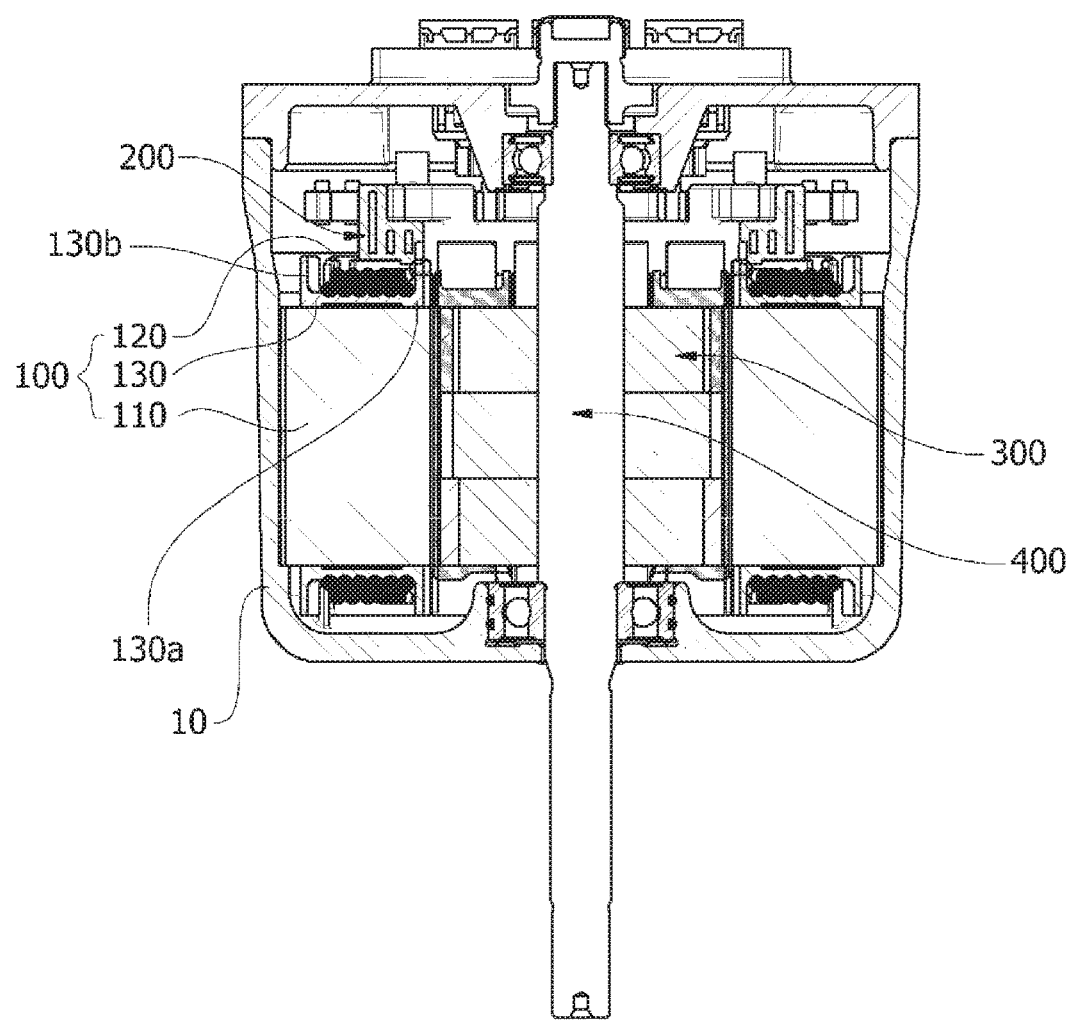
FIG. 1 is a view illustrating a motor according to one embodiment of the present invention.

FIG. 1 is a view illustrating a motor according to one exemplary embodiment of the present invention.

Referring to FIG. 1, the motor according to one exemplary embodiment of the present invention may include a stator 100, a busbar 200, a rotor 300, and a shaft 400.

The stator 100 is coupled to a housing 10, and the rotor 300 is disposed inside the stator 100. The shaft 400 may be coupled to a center portion of the rotor 300. Coils 120 are wound around the stator 100 to have a magnetic pole. The rotor 300 is rotated by a magnetic field formed by the winding of the coils 120, and the shaft 400 is rotated at the same time.

The stator 100 may include a plurality of stator cores 110. In one embodiment, the stator cores 110 may be formed by stacking a plurality of steel plates which each include a ring-shaped yoke and stator teeth disposed in a circumferential direction and protruding from the yoke toward an inner side in a diameter direction at regular angles. The coils 120 that form a rotating magnetic field may be wound around the stator teeth. In this case, the coils 120 may be insulated by insulators 130.

Each of the insulators 130 may be coupled to upper and lower sides of the stator cores 110 and insulate so that a current does not flow from the coils 120 wound around the stator teeth to the stator cores 110. The insulators 130 may be formed of a resin material.

An inner circumferential part 130a and an outer circumferential part 130b are respectively provided on an outer circumferential surface side and an inner circumferential surface side of the insulator 130 to prevent the coils 120 from being detached and guide a winding position thereof.

The busbar 200 may be provided on the stator 100. The busbar 200, which connects the coils 120 disposed in parallel, is electrically connected to the coils 120. A ring-shaped body 210 made of an insulating material is provided on the busbar 200, and terminals 220 connected to the coils 120 are provided on the body. The busbar 200 is connected to the terminals 220 and may supply power to the coils 120 through power terminals receiving external power of mutually different poles.

The rotor 300 is disposed inside the stator 100. The rotor 300 may include a rotor core and a magnet coupled to each other. Optionally, the rotor core and the magnet may be integrally formed. Also, the rotor 300 may be formed as a type of rotor in which a magnet is coupled to an outer circumferential surface of a rotor core or a type of rotor in which a magnet may be inserted into a pocket of a rotor core. A sensing magnet that obtains position information of the rotor 300 is coupled to a plate and is installed on the rotor 300, or a rotor position sensing unit similar to the sensing magnet may be installed.

Both ends of the shaft 400 may be rotatably supported by a bearing.

Hereinafter, a configuration in which the insulators 130 support the busbar 200 to prevent the busbar 200 from moving will be described with reference to the drawing.

The rotor according to one exemplary embodiment of the present invention increases a coupling force between the busbar 200 and the insulators 130 through vibration prevention units 131 and 132. The vibration prevention units 131 and 132 are in contact with an inner circumferential surface of the busbar 200 and prevent the busbar 200 from being moved due to vibration.

In the description of the vibration prevention units, two types of the vibration prevention units 131 and 132 will be described as examples according to a coupling structure thereof with the bulbar 200.

The vibration prevention unit 131 according to a first modified example

Figure 2:
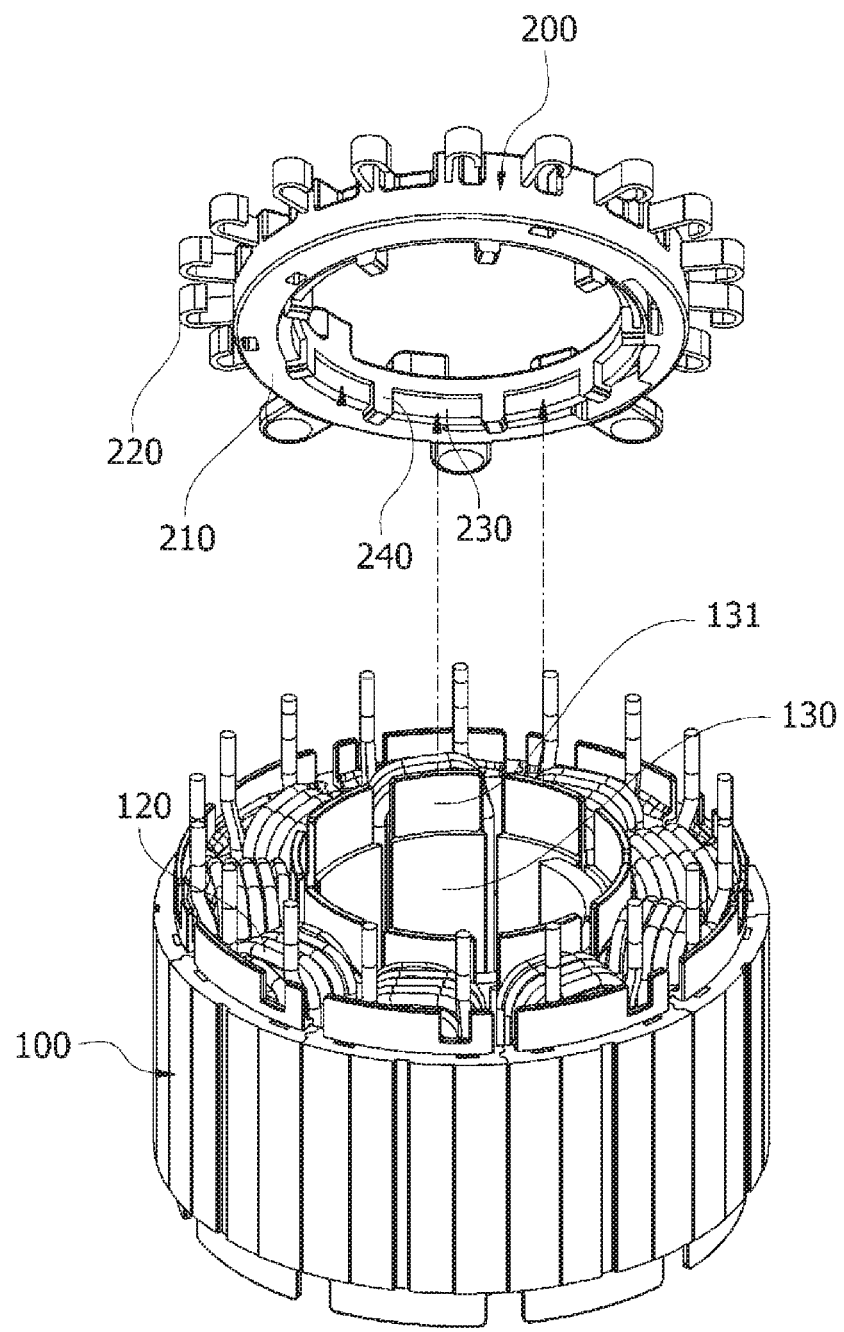
FIG. 2 is a view illustrating a vibration prevention unit and a slot according to a first modified example.
Figure 3:
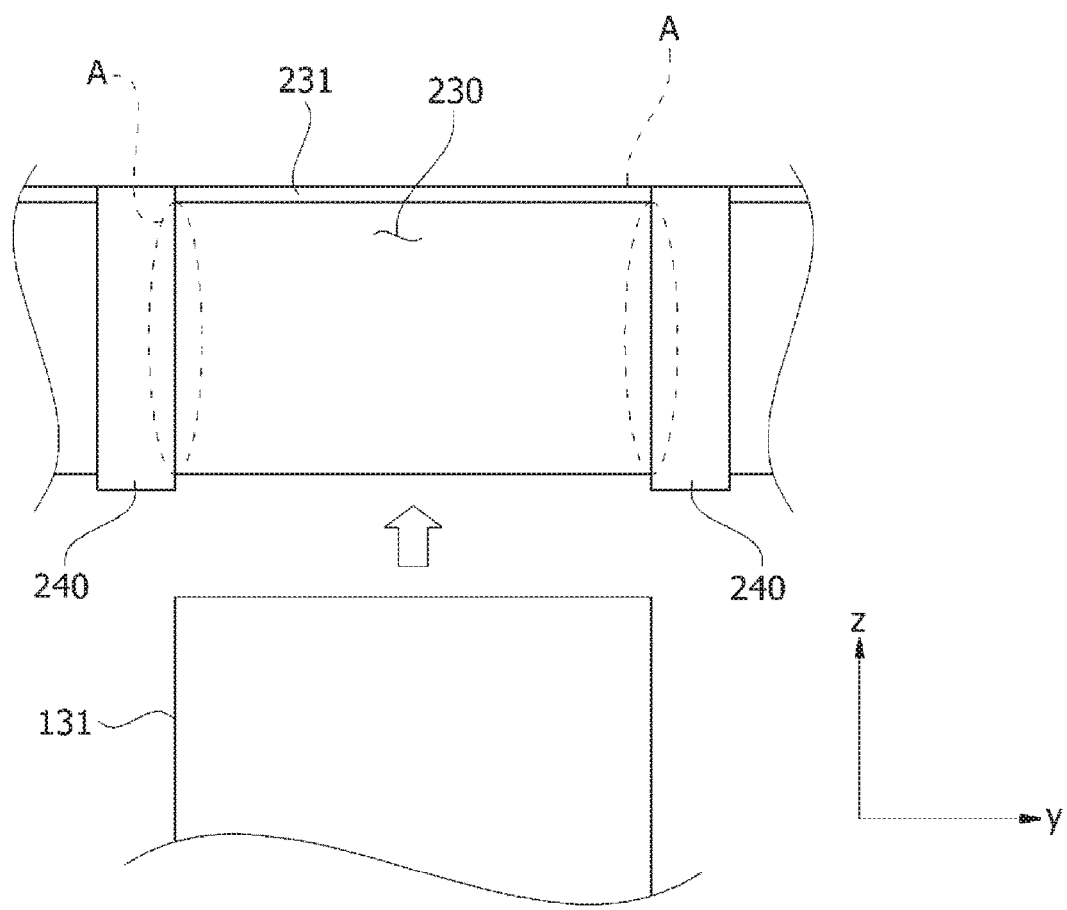
FIG. 3 is a cross-sectional view illustrating a coupling state of the vibration prevention unit and the slot shown in FIG. 2.
Figure 4:
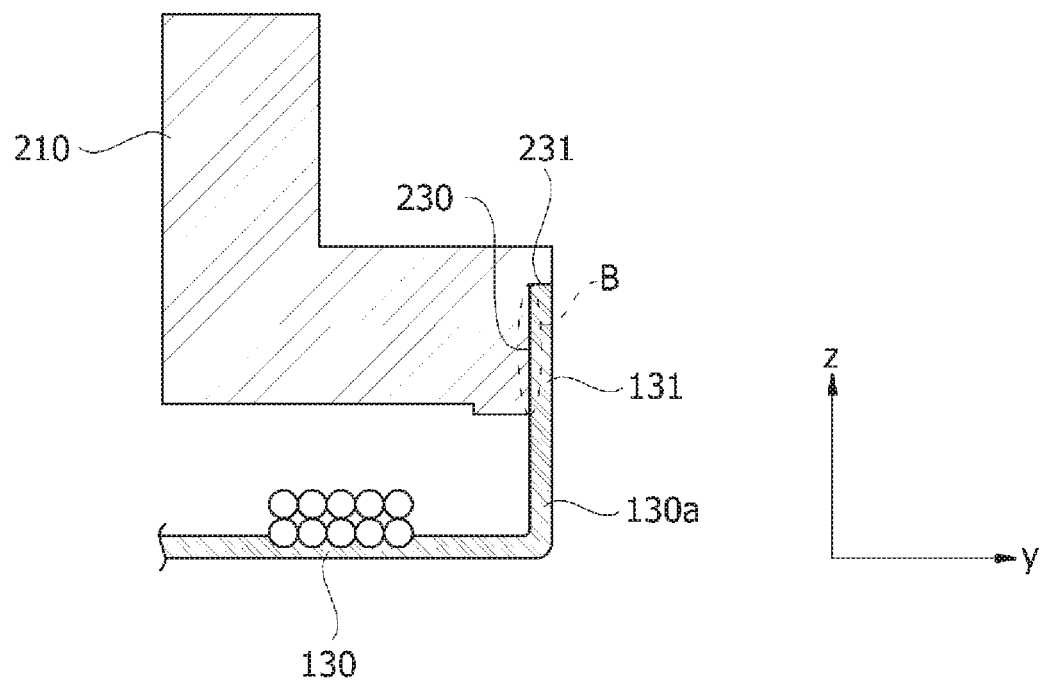
FIG. 4 is a view illustrating a state in which the vibration prevention unit shown in FIG. 2 is forcibly inserted into the slot.

FIG. 2 is a view illustrating a vibration prevention unit and a slot according to a first modified example, FIG. 3 is a cross-sectional view illustrating a coupling state of the vibration prevention unit and the slot shown in FIG. 2, and FIG. 4 is a view illustrating a state in which the vibration prevention unit shown in FIG. 2 is forcibly inserted into the slot. In FIGS. 2 to 4, only specified parts are shown for a conceptually clear understanding of a configuration relation of the invention. Accordingly, the drawings may be modified in various forms and may not be significantly limited to a specific form illustrated in the drawings.

Referring to FIGS. 2 to 4, the vibration prevention unit 131 may have a plate shape extending upward from the inner circumferential part 130a of the insulator 130. The vibration prevention unit 131 may be formed in a curved plate shape like the inner circumferential part 130a of the insulator 130 so that an outer circumferential surface thereof is in contact with the inner circumferential surface of the insulator 130. The vibration prevention unit 131 may be disposed on an upper surface of the inner circumferential part of each of the insulators 130.

While the vibration prevention unit 131 may be described as being distinguished from the inner circumferential part 130a of the insulator 130 depending on a shape and functional performance thereof, the vibration prevention unit 131 and the inner circumferential part 130a may be one vertically connected unit.

Meanwhile, a slot 230 into which the vibration prevention unit 131 is inserted may be formed in an inner circumferential surface of the body 210 of the bulbar 200. Referring to FIG. 3, the vibration prevention unit 131 may be forcibly inserted into the slot 230 in a height direction thereof, i.e., a z-axis direction of FIG. 3 (a y-axis of FIG. 3 is a radial direction of the motor), along guide units 240 disposed on both sides of the slot 230. Sides of the vibration prevention unit 131 are in contact with and rub sides of the guide units 240 in areas A shown in FIG. 3. Thus, the busbar 200, which is vulnerable to a fixing force, may be strongly fixed by the insulators 130 without being shaken due to vibration.

Referring to FIG. 4, the outer circumferential surface of the vibration prevention unit 131 is in contact with the inner circumferential surface of the busbar 200 provided with the slots 230 and is inserted into the slots 230, and is in contact with and rubs an area B shown in FIG. 4. Thus, the busbar 200 may be more strongly fixed by contact surfaces between the vibration prevention unit 131 and the guide units 240 and contact surfaces between the slots 230 and the vibration prevention unit 131.

The guide units 240 protrude inward from the inner circumferential surface of the busbar 200 to divide the slots 230. The guide units 240 may be disposed in a circumferential direction at regular intervals. Positions of the guide units 240 may be determined to correspond to positions of the insulators 130.

Meanwhile, a stepped portion 231 may be formed in an area forming an upper edge of the slot 230. The stepped portion 231 protrudes inward from an upper end of the inner circumferential surface of the busbar 200 and is in contact with an upper surface of the vibration prevention unit 131. In this case, a stepped surface of the stepped portion 231 may be horizontally formed, and correspondingly, the upper surface of the vibration prevention unit 131 may also be horizontally formed.

The vibration prevention unit 132 according to a second modified example

Hereinafter, the vibration prevention unit 132 according to a second modified example will be described with reference to the drawing on the basis of a difference with the vibration prevention unit 131 according to the first modified example.

Figure 5:
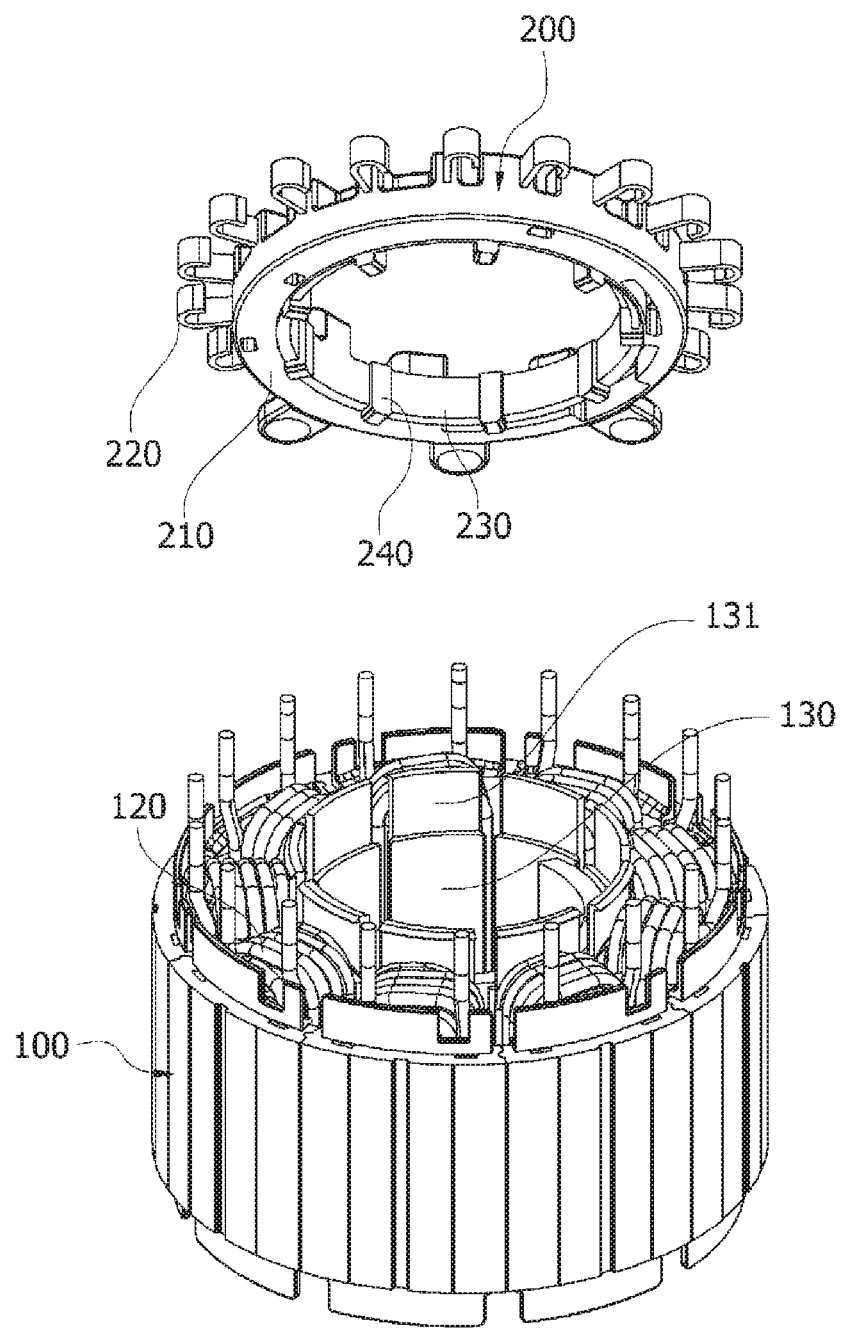
FIG. 5 is a view illustrating a vibration prevention unit and a slot according to a second modified example.
Figure 6:
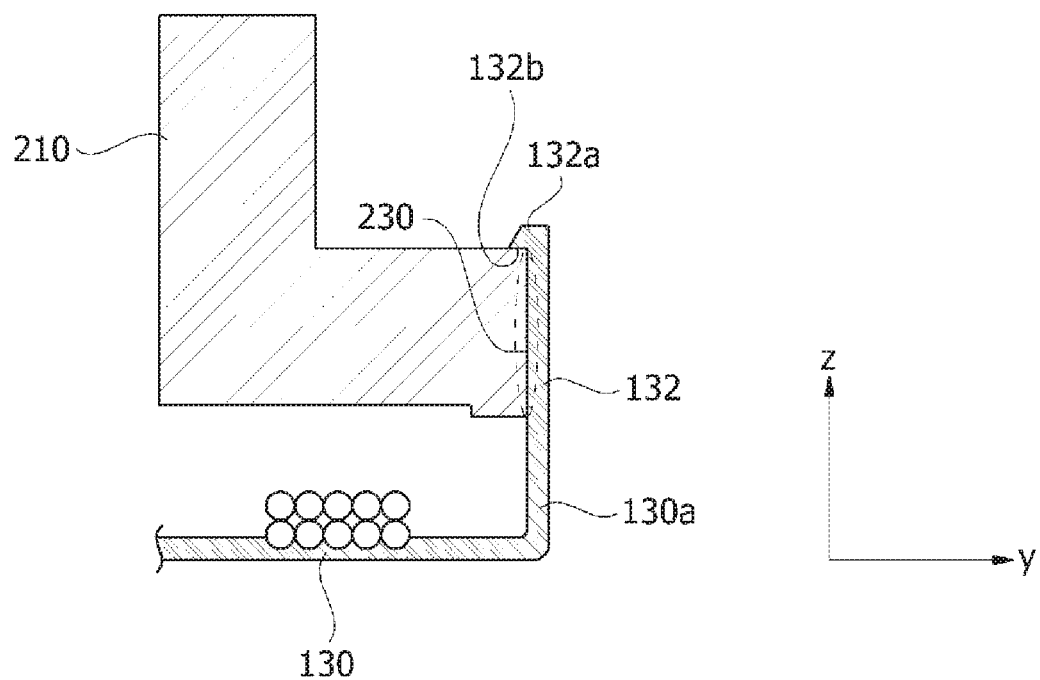
FIG. 6 is a cross-sectional view illustrating a coupling state of the vibration prevention unit and the slot shown in FIG. 5.

FIG. 5 is a view illustrating a vibration prevention unit and a slot according to a second modified example, and FIG. 6 is a cross-sectional view illustrating a coupling state of the vibration prevention unit and the slot shown in FIG. 5. In FIGS. 5 and 6, only specified parts are shown for a conceptually clear understanding of the configuration relation of the invention. Accordingly, the drawing may be modified in various forms and may not be significantly limited to a specific form illustrated in the drawings.

Referring to FIGS. 5 and 6, a hook 132a may be formed on an upper end of the vibration prevention unit 132. The hook 132a may protrude inward from the upper end of the vibration prevention unit 132 toward the center of the motor to form a blocking surface 132b. A slot 230 may be formed to pass from a lower end of the inner circumferential surface of the busbar 200 to the upper end thereof.

When the hook 132a of the vibration prevention unit 132 is inserted into the slot 230 up to the upper end of the inner circumferential surface of the the busbar 200, the blocking surface 132b of the hook 132a presses the upper end of the inner circumferential surface of the busbar 200 to prevent the busbar from being moved by vibration.

Figure 7:
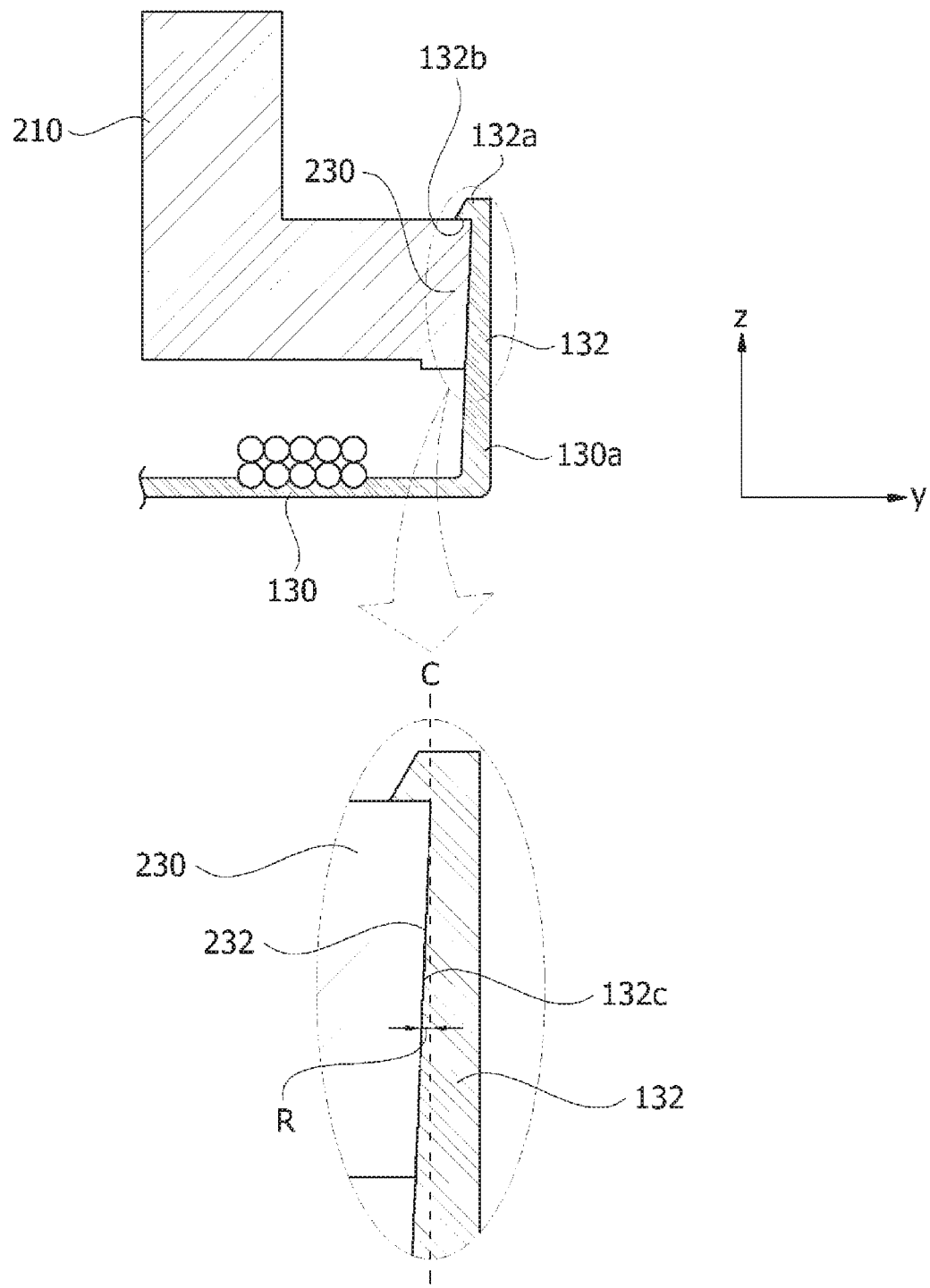
FIG. 7 is a view illustrating a modified example of a vibration prevention unit.

FIG. 7 is a view illustrating a modified example of the vibration prevention unit.

Referring to FIG. 7, a contact surface 232 of a slot 230 may be formed to be inclined by a predetermined angle R from a reference line CL formed in a z-axis direction of FIG. 7. That is, the slot 230 may be formed to be inclined toward the center of the body 210 from a y-axis direction. Correspondingly, a side 132c of the vibration prevention unit 131 may also be formed to be inclined. The above structure s for securing workability for an assembly of the slot 230 and the vibration prevention unit 132 in consideration of the body 210 of the busbar 200 disposed above the insulators 130.

According to one embodiment of the present invention, a vibration prevention unit connected with an inner circumferential part of an insulator supports an inner circumferential surface of a busbar, and thus a motor can prevent the busbar from moving without an additional process or component to prevent a coating of a coil from being worn or cut.

Also, according to one embodiment of the present invention, a vibration prevention unit is forcibly inserted into a slot formed on an inner circumferential surface of a busbar, and thus a motor can more stably prevent the busbar from moving with a simple assembly process.

As described above, the motor according to one exemplary embodiment of the present invention has been described in detail with reference to the exemplary embodiments.

While the present invention has been particularly described with reference to the exemplary embodiments, it should be understood by those of skilled in the art that various changes, modifications, and replacements may be made without departing from the spirit and scope of the present invention. Therefore, the exemplary embodiments and accompanying drawings should be considered in a descriptive sense only and not for purposes of limitation. Accordingly, the scope of the invention is not limited by the embodiments and accompanying drawings. The scope of the invention is defined not by the detailed description of the invention but by the appended claims, and encompasses all modifications and equivalents that fall within the scope of the appended claims.

DESCRIPTION OF SYMBOLS

100: STATOR
110: STATOR COIL
120: COIL
130: INSULATOR
130a: INNER CIRCUMFERENTIAL PART
130b: OUTER CIRCUMFERENTIAL PART
131,132: VIBRATION PREVENTION UNITS
132a: HOOK
132b: BLOCKING SURFACE
200: BUSHBAR
210: BODY
220: TERMINAL
230: SLOT
240: GUIDE UNIT
300: ROTOR
400: SHAFT

What is claimed is:
1. A motor comprising:
A stator including a stator core, a coil wound around the stator core, and an insulator mounted on the stator core and configured to insulate the coil and the stator core, wherein the insulator includes a vibration prevention unit;
a busbar disposed on the stator and conductively connected to the coil, including a plurality of recesses wherein each recess has an upper surface and a lateral surface perpendicular to the upper surface and is formed on an inner circumferential surface of the busbar to receive the vibration prevention unit, and including guide units disposed between adjacent recesses;
a rotor disposed inside the stator; and
a shaft coupled to the rotor,
wherein the vibration prevention unit extends upward from an upper surface of an inner circumferential part thereof and is in contact with the inner circumferential surface of the busbar;
wherein sides of the vibration prevention unit are in contact with and rub sides of the guide units,
wherein the vibration prevention unit includes a hook formed on an upper end of the vibration prevention unit, the hook is formed to protrude inwardly, and the hook includes a blocking surface blocking an upper surface of the busbar, wherein the recesses are formed to be inclined toward a center of a ring-shaped body made of an insulating material and provided on the busbar, and wherein a side of the vibration prevention unit is formed to be inclined.

2. The motor of claim 1, wherein the outer circumferential part of the vibration prevention unit is in contact with the inner circumferential surface of the busbar.

3. The motor of claim 1, wherein the vibration prevention unit is forcibly inserted into the recesses.

4. The motor of claim 1, wherein the busbar includes a stepped portion protruding from an upper end of the inner circumferential surface thereof and a lower side of the stepped portion is in contact with an upper side of the vibration prevention unit.

5. The motor of claim 4, wherein the stepped portion has a stepped surface formed to be parallel to an upper surface of the vibration prevention unit.

6. The motor of claim 4, wherein the stepped portion has a lateral surface formed to be in parallel to the lateral surfaces of the plurality of recesses.

7. The motor of claim 1, wherein the vibration prevention unit includes a hook formed on an upper end thereof.

8. The motor of claim 7, wherein the hook is formed to protrude inward.

9. The motor of claim 8, wherein the hook includes a blocking surface blocking an upper surface of the busbar.

10. The motor of claim 9, wherein the blocking surface is parallel to the upper surface of the busbar.

\* \* \* \* \*